United States Patent
Chavez, Jr. et al.

(10) Patent No.: US 6,427,074 B1
(45) Date of Patent: Jul. 30, 2002

(54) BATTERY CHARGING INDICATION MESSAGE FROM A WIRELESS TERMINAL

(75) Inventors: David L. Chavez, Jr., Thornton; Stephen M. Thieler, Boulder, both of CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/386,867

(22) Filed: Aug. 31, 1999

(51) Int. Cl.[7] .............................. H04M 3/42; H04Q 7/20; H04B 1/38
(52) U.S. Cl. ..................... 455/417; 455/414; 455/573
(58) Field of Search ............................... 455/572, 573, 455/574, 575, 515, 516, 517, 423, 424, 425, 426, 417, 414

(56) References Cited

U.S. PATENT DOCUMENTS

| | | | |
|---|---|---|---|
| 4,017,692 A | * | 4/1977 | Garcia et al. .............. 179/81 R |
| 5,448,625 A | | 9/1995 | Lederman |
| 5,557,658 A | | 9/1998 | Gregorek et al. |
| 5,884,262 A | | 3/1999 | Wise et al. |
| 5,970,124 A | | 10/1999 | Csaszer et al. |
| 6,052,438 A | | 4/2000 | Wu et al. |
| 6,151,500 A | * | 11/2000 | Cardina et al. .............. 455/435 |
| 6,192,231 B1 | * | 2/2001 | Chapmam et al. .......... 455/401 |

* cited by examiner

Primary Examiner—Edward F. Urban
Assistant Examiner—Meless Zewdu
(74) Attorney, Agent, or Firm—John C. Moran

(57) ABSTRACT

Transmitting a "plugged into charger" message to a wireless telecommunication switching system by a wireless terminal when inserted into a charging unit. The wireless telecommunication switching system is responsive to the "plugged into charger" message to remove the wireless terminal from the call coverage path of the user. The wireless telecommunication switching system can add to the call coverage path of the user the telephone number of the cellular telephone utilized by the user when the user is out of the building. In a second embodiment of the invention, the wireless terminal transmits the message to invoke the "send all calls" state when the wireless terminal is plugged into a charging unit. In a third embodiment of the invention, the wireless terminal transmits a call transfer message that transfers all incoming calls to another terminal when the wireless terminal is plugged into the charging unit.

8 Claims, 7 Drawing Sheets

BATTERY CHARGING INDICATION MESSAGE FROM A WIRELESS TERMINAL

TECHNICAL FIELD

This invention relates to telecommunications switching, and in particular, to wireless terminals.

BACKGROUND OF THE INVENTION

Wireless terminals utilized in an in-building environment normally are part of the user's call coverage group (also referred to as a call coverage path). Often, the call coverage group will consist of the user's wired telephone, wireless telephone, secretarial support telephone, and voice messaging system. In most instances, a wireless terminal is left in a desktop or a bulk charging unit when the user is not expecting to receive calls or has left the building. Since the wireless terminal is typically within the wireless coverage area of the wireless telecommunication switching system capable of receiving calls, the wireless telecommunication switching system attempts to deliver calls to the wireless terminal as part of the call coverage group. Normally, a wireless telecommunication switching system will attempt to alert a wireless terminal for 24 seconds before attempting to complete an incoming call on the next unit in the call coverage group. The wireless telecommunication switching system has no mechanism for determining that the wireless terminal is being charged. In many installations, bulk charging units are utilized. The bulk charging unit is placed next to the exit and entrance from the building and is utilized to charge a number of wireless terminals at one time while the users are out of the building.

The prior art has attempted to resolve this problem by allowing the user to turn the wireless terminal off, thus providing an "out of area" indication to the wireless telecommunication system when the wireless terminal is turned off. Unfortunately, it takes a great amount of time before the wireless telecommunication system detects that the wireless terminal is no longer powered on. In addition, it is very easy for the user to forget to power down the wireless terminal when inserting it into a battery charger. Other prior art wireless telecommunication systems allow the user to activate a button on the wireless terminal to place the wireless terminal in a "send all calls" state by initiating the "send all calls" feature. This causes the prior art wireless telecommunication switching system to immediately advance to the next device in the call coverage path. Unfortunately, users forget to initiate the "send all calls" state before they insert their wireless terminal into the charger. Also, users will forget to deactivate the "send all calls" feature after removing their wireless terminals from the charger. This results in the users missing calls that normally would have been received on their wireless terminals.

SUMMARY OF THE INVENTION

This invention is directed to solving these and other problems and disadvantages of the prior art. Illustratively according to the invention, a wireless terminal when inserted into a charging unit transmits to a wireless telecommunication switching system a "plugged into charger" message. The wireless telecommunication switching system is responsive to the "plugged into charger" message to remove the wireless terminal from the call coverage path of the user.

Advantageously, the wireless telecommunication switching system can add to the call coverage path of the user the telephone number of the cellular telephone utilized by the user when the user is out of the building.

Advantageously, in a second embodiment of the invention, the wireless terminal transmits the message to invoke the "send all calls" state when the wireless terminal is plugged into a charging unit. Advantageously, in a third embodiment of the invention, the wireless terminal transmits a call transfer message that transfers all incoming calls to another terminal when the wireless terminal is plugged into the charging unit.

These and other features and advantages of the present invention will become apparent from the following description of illustrative embodiments of the invention considered together with the drawing.

DETAILED DESCRIPTION

Figure 1:
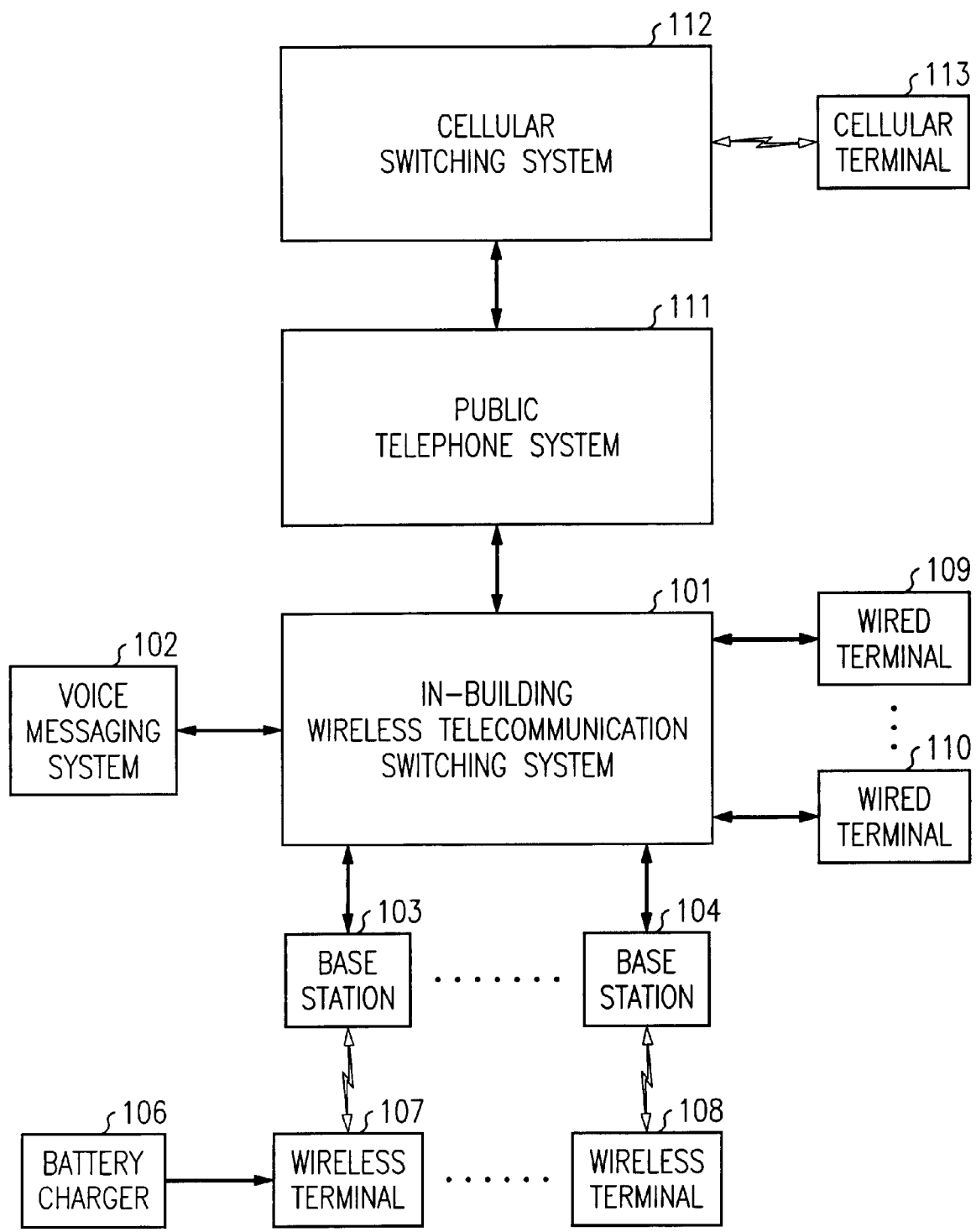
FIG. 1 illustrates, in block diagram form, a system for implementing the invention.

FIG. 1 illustrates an embodiment for implementing the invention. In-building wireless telecommunication switching system 101 provides a wireless service via base stations 103–104 to wireless terminals 107–108. In addition, in-building switching system 101 provides wired service to wired terminals 109–110. Voice messaging system 102 is connected to in-building switching system 101 so as to provide voice messaging capabilities. In-building switching system 101 is interconnected to public telephone system 111 and to cellular switching system 112 via public telephone system 111. When in the building serviced by in-building switching system 101, each user has associated with them a wired terminal and a wireless terminal. In addition, each user has a call coverage path which includes their wired terminal, their wireless terminal, voice messaging system 102, and another wired terminal. For example, assume that a user is assigned wired terminal 109, is assigned wireless terminal 107, and is provided coverage by wired terminal 110. The user's call coverage path could advantageously be that the call is first placed to wired terminal 109, then to wireless terminal 107, then to wired terminal 110, and finally if none of the terminals answered, to voice messaging system 102. In the first embodiment of the invention, when the user inserts wireless terminal 107 into battery charger 106, wireless terminal 107 sends a message to in-building switching system 101 informing in-building switching system 101 that it has been inserted into a battery charger. In-building switching system 101 is responsive to the message to alter the call coverage path for the user of wireless terminal 107. This alteration of the call coverage path may be as simple as temporarily removing wireless terminal 107 from the call coverage path so that a call is first routed to wired terminal 109, then to wired terminal 110, and finally to voice messaging system 102. Advantageously, if the user has assigned to them cellular terminal 113 and it is assumed they have left the building, then, in-building switching system 101 substitutes the telephone number for cellular terminal 113 in place of the telephone number of wireless terminal 107.

In the second embodiment of the invention, when plugged into battery charger 106, wireless terminal 107 sends a "send all calls" message to in-building switching system 101. In-building switching system 101 responds to this message as if the user had manually caused the "send all calls" message to be transmitted.

In the third embodiment of the invention when plugged into battery charger 106, wireless terminal 107 sends a "call transfer" message to in-building switching system 101. The "call transfer" message includes the telephone number to which all calls directed to wireless terminal 107 are to be redirected. In general, when the third embodiment is implemented, wireless terminal 107 is not part of a call coverage path. For example, if the user of wireless terminal 107 is going to be out of the building and using cellular terminal 113, wireless terminal 107 is programmed by the user to transmit the telephone number of cellular terminal 113 as part of the "call transfer" message.

Figure 2:
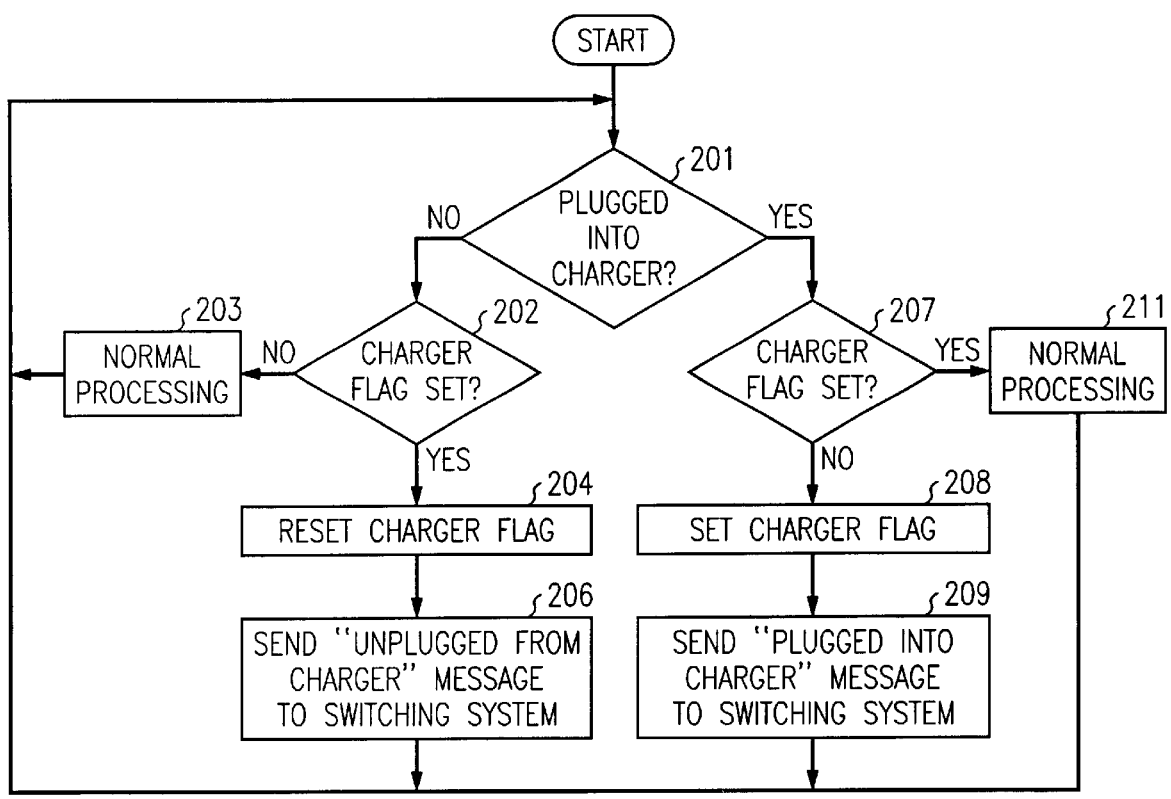
FIG. 2 illustrates, in flow chart form, steps for implementing the first embodiment of the invention by a wireless terminal.

FIG. 2 illustrates, in flow chart form, the steps performed by a wireless terminal in implementing the first embodiment of the invention. Once started, decision block 201 determines if the wireless terminal is plugged into a charger. If the answer is no, control is transferred to decision block 202 which determines if the charger flag is set. The charger flag is set by the wireless terminal when it is plugged into the charger. If the answer is no in decision block 202, control is transferred to decision block 203 for normal processing before control is returned back to decision block 201. A no in decision block 202 indicates that the wireless terminal has not just been removed from the battery charger. If the answer in decision block 202 is yes, control is transferred to block 204 which resets the charger flag before transferring control to block 206. Block 206 sends the "unplugged from charger" message to in-building switching system 101 before returning control back to decision block 201.

Returning to decision block 201, if the answer is yes, control is transferred to decision block 207 which determines if the charger flag is set. If the answer in decision block 207 is yes, the wireless terminal has remained plugged into the battery charger and no action is necessary. Hence, control is transferred to block 211 for normal processing before being transferred back to decision block 201. If the answer in decision block 207 is no, control is transferred to block 208 which sets the charger flag before transferring control to block 209. Block 209 sends the "plugged into charger" message to in-building switching system 101 before transferring control back to decision block 201.

Figure 3:
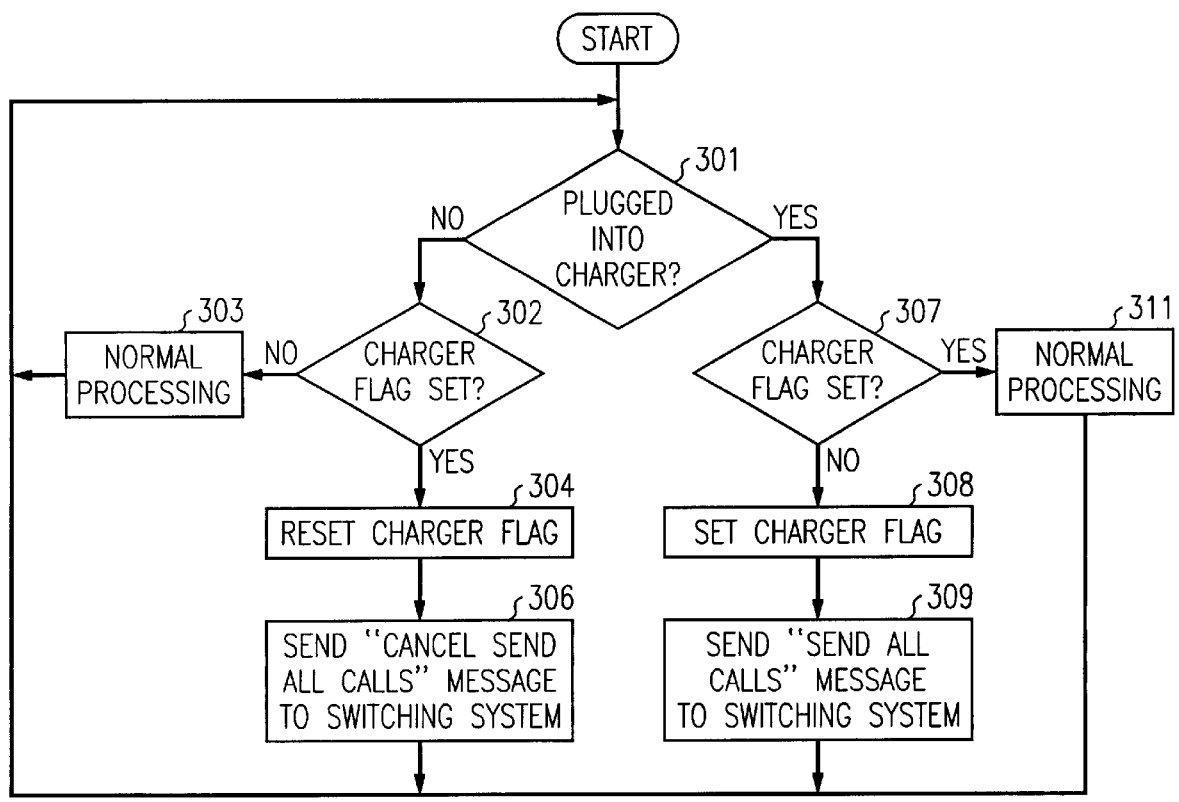
FIG. 3 illustrates, in flow chart form, steps for implementing the second embodiment of the invention by a wireless terminal.

FIG. 3 illustrates, in flow chart form, the steps performed by a wireless terminal in implementing the second embodiment of the invention. Once started, decision block 301 determines if the wireless terminal is plugged into a charger. If the answer is no, control is transferred to decision block 302 which determines if the charger flag is set. The charger flag is set by the wireless terminal when it is plugged into the charger. If the answer is no in decision block 302, control is transferred to decision block 303 for normal processing before control is returned back to decision block 301. A no in decision block 302 indicates that the wireless terminal has not just been removed from the battery charger. If the answer in decision block 302 is yes, control is transferred to block 304 which resets the charger flag before transferring control to block 306. Block 306 sends the "cancel send all calls" message to in-building switching system 101 before returning control back to decision block 301.

Returning to decision block 301, if the answer is yes, control is transferred to decision block 307 which determines if the charger flag is set. If the answer in decision block 307 is yes, the wireless terminal has remained plugged into the battery charger and no action is necessary. Hence, control is transferred to block 311 for normal processing before being transferred back to decision block 301. If the answer in decision block 307 is no, control is transferred to block 308 which sets the charger flag before transferring control to block 309. Block 309 sends the "send all calls" message to in-building switching system 101 before transferring control back to decision block 301.

Figure 4:
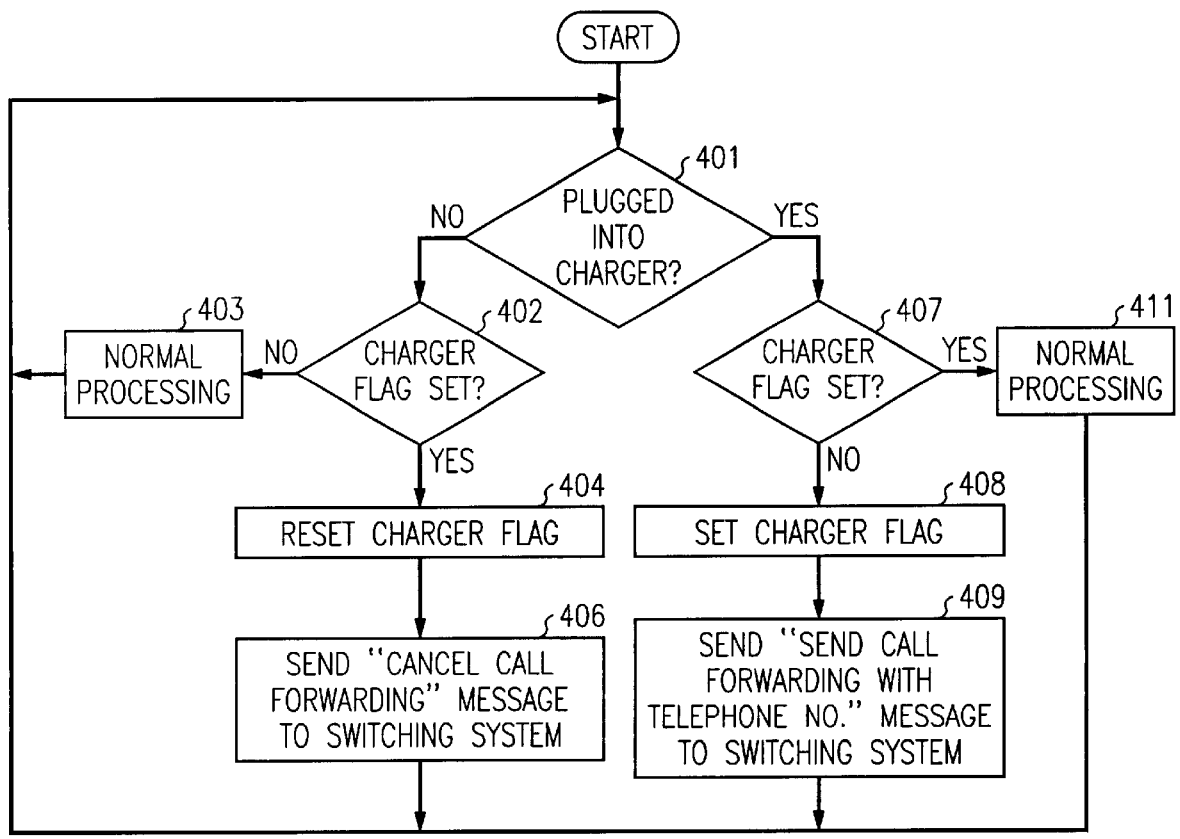
FIG. 4 illustrates, in flow chart form, steps for implementing a third embodiment of the invention by a wireless terminal.

FIG. 4 illustrates, in flow chart form, the steps performed by a wireless terminal in implementing the third embodiment of the invention. Once started, decision block 401 determines if the wireless terminal is plugged into a charger. If the answer is no, control is transferred to decision block 402 which determines if the charger flag is set. The charger flag is set by the wireless terminal when it is plugged into the charger. If the answer is no in decision block 402, control is transferred to decision block 403 for normal processing before control is returned back to decision block 401. A no in decision block 402 indicates that the wireless terminal has not just been removed from the battery charger. If the answer in decision block 402 is yes, control is transferred to block 404 which resets the charger flag before transferring control to block 406. Block 406 sends the "cancel call forwarding" message to in-building switching system 101 before returning control back to decision block 401.

Returning to decision block 401, if the answer is yes, control is transferred to decision block 407 which determines if the charger flag is set. If the answer in decision block 407 is yes, the wireless terminal has remained plugged into the battery charger and no action is necessary. Hence, control is transferred to block 411 for normal processing before being transferred back to decision block 401. If the answer in decision block 407 is no, control is transferred to block 408 which sets the charger flag before transferring control to block 409. Block 409 sends the "call forwarding with telephone number" message to in-building switching system 101 before transferring control back to decision block 401. The telephone number included in the message to invoke call forwarding is the telephone number to which calls are to be forward.

Figure 5:
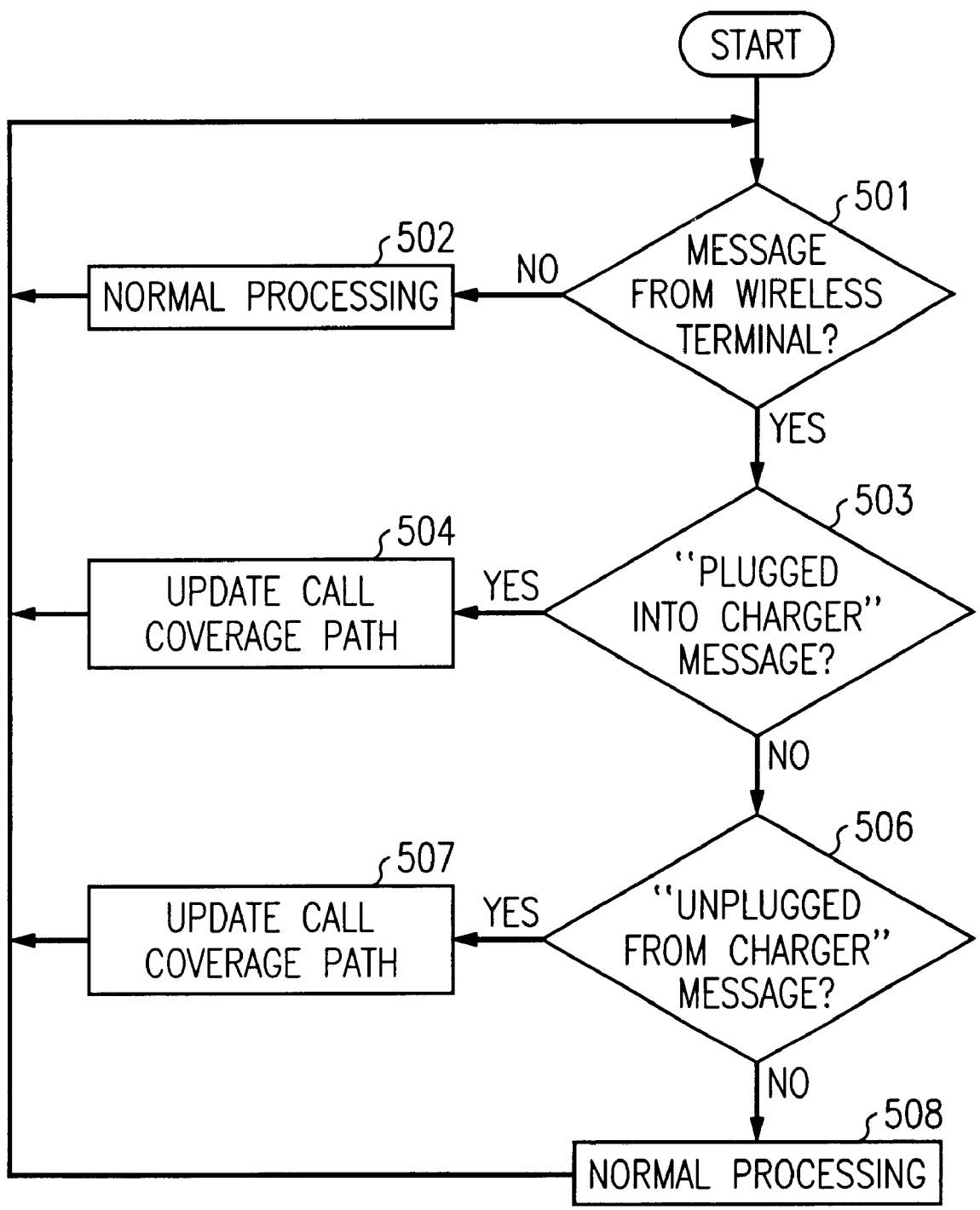
FIG. 5 illustrates, in flow chart form, steps for implementing the first embodiment of the invention by a wireless telecommunication switching system.

FIG. 5 illustrates, in flow chart form, the steps performed by in-building wireless telecommunication switching system 101 in implementing the first embodiment of the invention. When started, decision block 501 examines a message to determine if it is from a wireless terminal. If the answer is no, block 502 performs normal processing before returning control back to decision block 501. Block 502 performs processing that is well-known by those skilled in the art for a switching system such as in-building switching system 101. If the answer is yes in decision block 501, control is transferred to decision block 503 which determines if a "plugged into charger" message has been received from a wireless terminal. If the answer is yes, control is transferred to block 504 which updates the call coverage path of which the wireless terminal is part. In the previously described examples for the first embodiment, the operations performed by block 504 could consist of removing wireless terminal 107 from the call coverage path associated with the user of wireless terminal 107 or could involve replacing the telephone number of wireless terminal 107 with the telephone number of cellular terminal 113.

If the answer is no in decision block 503, control is transferred to decision block 506. The latter decision block determines if a "unplugged from charger" message has been received from a wireless terminal. If the answer is no, control is transferred to block 508 which performs the processing that is well-known by those skilled in the art for providing service to a plurality of wireless terminals by a system such as in-building wireless telecommunication switching system 101. If the answer yes in decision block 506, control is transferred to block 507 which resets the call coverage path for the user of the wireless terminal 107 as it would be when wireless terminal 107 is in use by the user.

Figure 6:
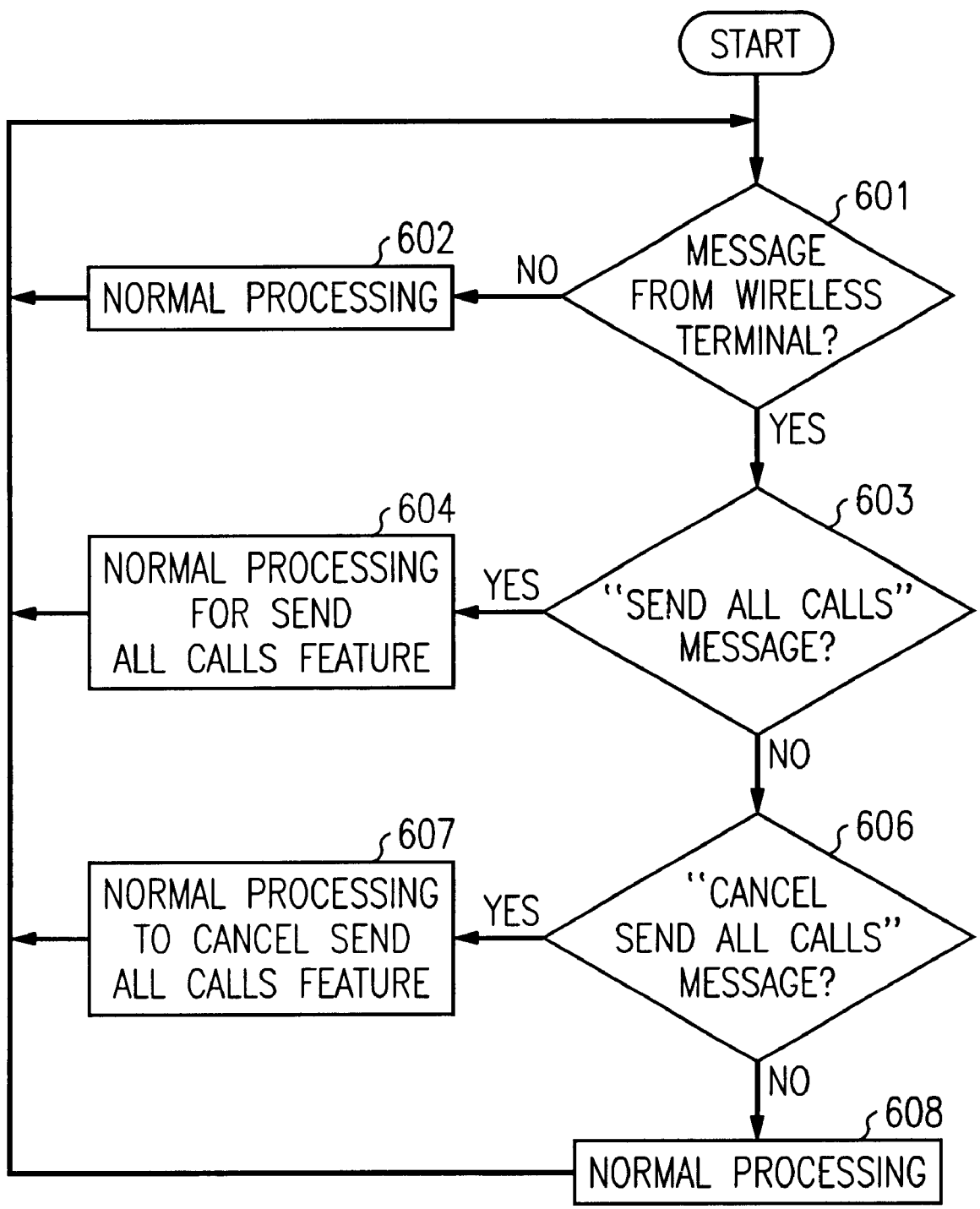
FIG. 6 illustrates, in flow chart form, steps for implementing the second embodiment of the invention by a wireless telecommunication switching system.

FIG. 6 illustrates, in flow chart form, the steps performed by in-building wireless telecommunication switching system 101 in implementing the second embodiment of the invention. When started, decision block 601 examines a message to determine if it is from a wireless terminal. If the answer is no, block 602 performs normal processing before returning control back to decision block 601. Block 602 performs processing that is well-known by those skilled in the art for a switching system such as in-building switching system 101. If the answer is yes in decision block 601, control is transferred to decision block 603 which determines if a "send all calls" message has been received from a wireless terminal. If the answer is yes, control is transferred to block 604 which performs normal processing to implement the "send all calls" feature.

If the answer is no in decision block 603, control is transferred to decision block 606. The latter decision block determines if a "cancel send all calls" message has been received from a wireless terminal. If the answer is no, control is transferred to block 608 which performs the processing that is well-known by those skilled in the art for providing service to a plurality of wireless terminals by a system such as in-building wireless telecommunication switching system 101. If the answer yes in decision block 606, control is transferred to block 607 which cancels the "send all calls" feature as it would if wireless terminal 107 had been manually activated by the user.

Figure 7:
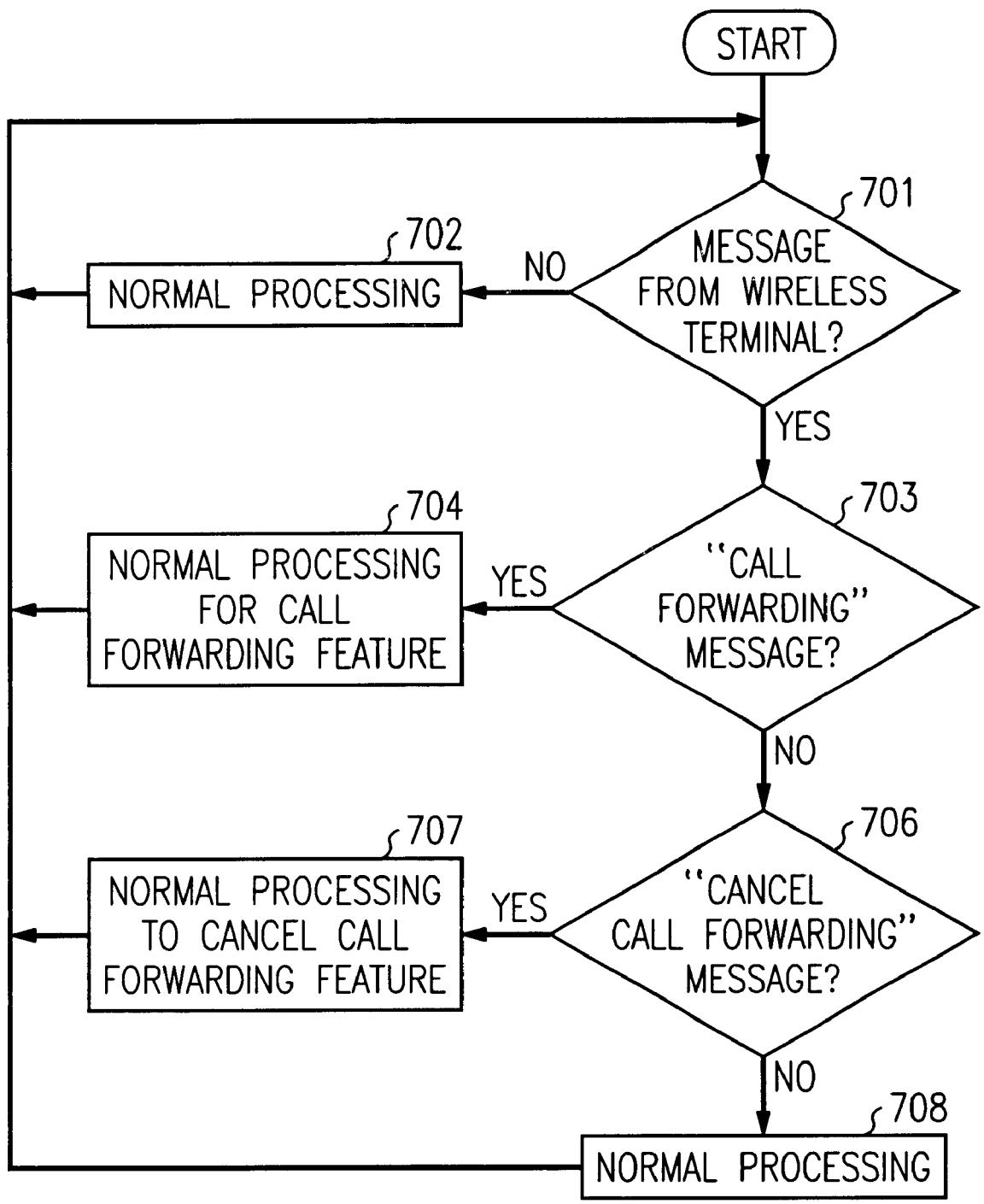
FIG. 7 illustrates, in flow chart form, steps for implementing the third embodiment of the invention by a wireless telecommunication switching system.

FIG. 7 illustrates, in flow chart form, the steps performed by in-building wireless telecommunication switching system 101 in implementing the third embodiment of the invention. When started, decision block 701 examines a message to determine if it is from a wireless terminal. If the answer is no, block 702 performs normal processing before returning control back to decision block 701. Block 702 performs processing that is well-known by those skilled in the art for a switching system such as in-building switching system 101. If the answer is yes in decision block 701, control is transferred to decision block 703 which determines if a "call forwarding" message has been received from a wireless terminal. If the answer is yes, control is transferred to block 704 which performs normal processing to implement the "call forwarding" feature by forwarding calls to the telephone number included in the message.

If the answer is no in decision block 703, control is transferred to decision block 706. The latter decision block determines if a "cancel send all calls" message has been received from a wireless terminal. If the answer is no, control is transferred to block 708 which performs the processing that is well-known by those skilled in the art for providing service to a plurality of wireless terminals by a system such as in-building wireless telecommunication switching system 101. If the answer yes in decision block 706, control is transferred to block 707 which cancels the "call forwarding" feature as it would if wireless terminal 107 had been manually activated by the user.

Of course, various changes and modifications to the illustrative embodiments described above will be apparent to those skilled in the art. Such changes and modifications can be made without departing from the spirit and the scope of the invention and without diminishing its attendant advantages. It is therefore intended that such changes and modifications be covered by the following claims except insofar as limited by the prior art.

What is claimed is:

1. A method of processing calls for a wireless terminal serviced by a wireless switching system, comprising the steps of:

detecting insertion into a battery charger by the wireless terminal;

transmitting a first message by the wireless terminal in response to the detection of insertion into the battery charger to request modification of a call coverage path of the wireless terminal resulting in removal of the wireless terminal from the call coverage path;

detecting removal from the battery charger by the wireless terminal; and transmitting a second message by the wireless terminal in response to the detection of removal from the battery charger to request modification of the call coverage path of the wireless terminal resulting in insertion of the wireless terminal back into the call coverage path.

2. The method of claim 1 further comprises the steps of removing the wireless terminal from the call coverage path in response to the first message by the wireless switching system; and inserting the wireless terminal back into the call coverage path in response to the second message by the wireless switching system.

3. The method of claim 2 further comprises the step of inserting a cellular telephone used by the user of the wireless terminal into the call coverage path in response to the first message by the wireless switching system.

4. The method of claim 3 further comprises the step of removing the cellular telephone used by the user of the wireless terminal from the call coverage path in response to the second message by the wireless switching system.

5. A method of processing calls for a wireless terminal serviced by a wireless switching system, comprising the steps of:

detecting insertion into a battery charger by the wireless terminal;

transmitting a first message by the wireless terminal in response to the detection of insertion into the battery charger where the first message requests activation of a send all call feature for the wireless terminal;

detecting removal from the battery charger by the wireless terminal; and transmitting a second message by the wireless terminal in response to the detection of removal from the battery charger where the second message requests deactivation of the send all call feature for the wireless terminal.

6. The method of claim 5 further comprises the step of routing calls to a cellular telephone used by the user of the wireless terminal by the wireless switching system in response the first message.

7. A method of processing calls for a wireless terminal serviced by a wireless switching system, comprising the steps of:

detecting insertion into a battery charger by the wireless terminal;

transmitting a first message by the wireless terminal in response to the detection of insertion into the battery charger where the first message requests activation of a call transfer feature for the wireless terminal and includes a telephone number to which calls are to be transferred;

detecting removal from the battery charger by the wireless terminal; and transmitting a second message by the wireless terminal in response to the detection of removal from the battery charger where the second message requests deactivation of the call transfer feature for the wireless terminal.

8. The method of claim 7 wherein the telephone number identifies a cellular telephone used by the user of the wireless terminal.

* * * * *